United States Patent
Bailiang (10) Patent No.: US 11,140,510 B2
(45) Date of Patent: Oct. 5, 2021

(54) CONTEXTUAL MAP VIEW (71) Applicant: Google LLC, Mountain View, CA (US)

(72) Inventor: Zhou Bailiang, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/467,841

(22) PCT Filed: Sep. 29, 2017

(86) PCT No.: PCT/US2017/054428
§ 371 (c)(1),
(2) Date: Jun. 7, 2019

(87) PCT Pub. No.: WO2018/106328
PCT Pub. Date: Jun. 14, 2018

(65) Prior Publication Data
US 2021/0014635 A1 Jan. 14, 2021

Related U.S. Application Data (60) Provisional application No. 62/431,622, filed on Dec. 8, 2016.

(51) Int. Cl.
H04W 4/00 (2018.01)
H04W 4/021 (2018.01)
H04M 1/72457 (2021.01)

(52) U.S. Cl.
CPC ....... *H04W 4/021* (2013.01); *H04M 1/72457* (2021.01)

(58) Field of Classification Search
CPC .............................. H04W 4/029; H04W 4/021
See application file for complete search history.

(56) References Cited

U.S. PATENT DOCUMENTS

2004/0054428 A1* 3/2004 Sheha ................ G06F 3/04817
700/56
2007/0032949 A1* 2/2007 Arai ...................... G01C 21/00
701/420

(Continued)

FOREIGN PATENT DOCUMENTS

JP 2015059841 3/2015
JP 2016517567 6/2016

(Continued)

OTHER PUBLICATIONS

International Search Report and Written Opinion for PCT/US2017/054428, dated Feb. 27, 2018, 14 pages.

(Continued)

*Primary Examiner* — Omoniyi Obayanju
(74) *Attorney, Agent, or Firm* — Dority & Manning, P.A.

(57) ABSTRACT

Systems and methods of providing map data to a user are provided. For instance, a plurality of points of interest associated with a geographic area to be displayed in a viewport associated with a digital mapping application can be identified. An adjusted position can be determined for an orientation point of interest. The adjusted position is a position that does not align with a position of the orientation point of interest in the physical world. A map topology associated with map data defining a visual representation of the geographic area can be adjusted based at least in part on the adjusted position. The orientation POI can be provided for display at the adjusted position associated with the map data within the mapping application.

20 Claims, 7 Drawing Sheets (56) References Cited

U.S. PATENT DOCUMENTS

2013/0326407 A1* 12/2013 van Os ............... G06F 3/04883
715/810
2014/0280230 A1 9/2014 Masato et al.

FOREIGN PATENT DOCUMENTS

| KR | 20150132268 | 11/2015 |
| KR | 20160048491 | 5/2016 |
| KR | 102108488 | 5/2020 |

OTHER PUBLICATIONS

Hosokawa, "A Location-Aware Information Browser Implemented on BREW-Based Mobile Phones", Symposium on Applied Computing, Mar. 16-20, 2008, Fortaleza, Ceara, Brazil, pp. 1878-1883.
Hosokawa et al., "An Implementation Method of Location-Based Active Map Transformation System", Conference on Mobile Data Management, May 9-13, 2005, Ayia Napa, Cyprus, pp. 13-21.
International Preliminary Report on Patentability for PCT/US2017/054428, dated Mar. 20, 2019, 13 pages.

\* cited by examiner

CONTEXTUAL MAP VIEW

PRIORITY CLAIM

The present application is based upon and claims the right of priority under 35 U.S.C. § 371 to International Application No. PCT/US2017/054428, filed Sep. 29, 2017, which claims the benefit of U.S. Provisional Application Ser. No. 62/431,622, filed Dec. 8, 2016. Applicant claims priority to and the benefit of each of such applications and incorporates all such applications herein by reference in their entirety.

FIELD

The present disclosure relates generally to mapping applications that display map data associated with a geographic area.

BACKGROUND

A geographic information system (GIS) is a system for archiving, retrieving, and manipulating data that has been stored and indexed according to the geographic coordinates of its elements. The system generally can utilize a variety of data types, such as imagery, maps, and tables. GIS technology can be integrated into Internet-based mapping applications.

Such mapping applications can be, or can otherwise be associated with, software applications that display interactive digital maps. For example, mapping applications may run on laptop and tablet computers, mobile phones, car navigation systems, hand-held global positioning system (GPS) units, etc. Many of these devices are equipped with a touchscreen, a touchpad, or are otherwise configured to receive input that includes finger gestures. A user may, for example, may pan across a map by swiping her finger in the desired direction, zoom in on an area by pinching two fingers together, etc.

In general, a mapping application can display various types of geographic data including topographical data, street data, urban transit information, and traffic data. Further, the geographic data may be schematic or based on photography, such as satellite imagery. Still further, a mapping application can display the information in a two-dimensional (2D) or three-dimensional (3D) format.

Figure 1:
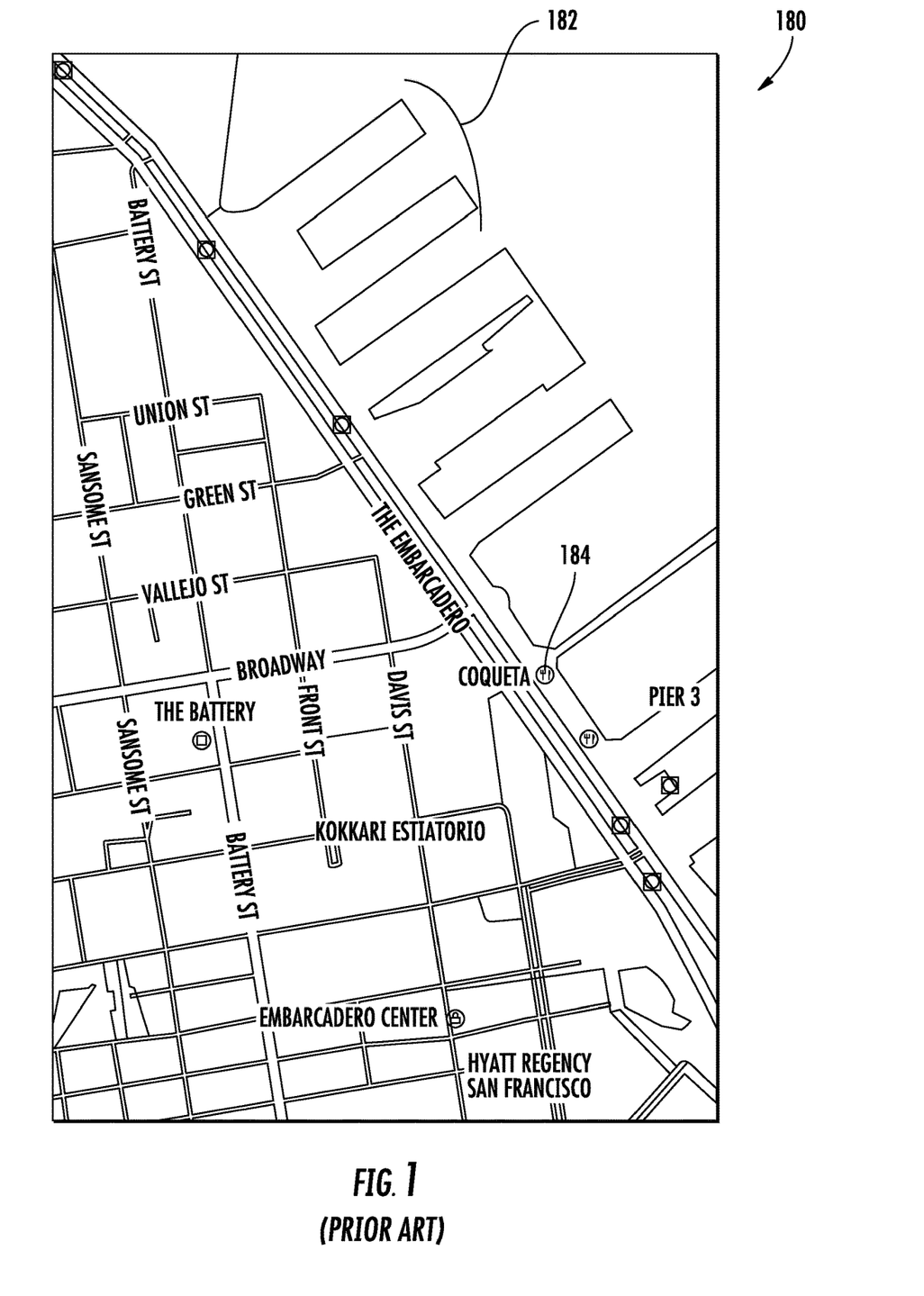
FIG. 1 depicts an example map displayed within a mapping application.

FIG. 1 depicts an example map 180 displayed by a mapping application. The map 180 depicts a geographic area, and can be displayed within a viewport of a user interface associated with the mapping application. As shown, the map 180 is displayed from a top-down perspective (also referred to as a bird's-eye view, overhead view, helicopter view, aerial view, etc.). Map 180 defines a map topology that includes a plurality of features, such as features 182. The map features are located within the map topology at positions that correspond to the positions of the features within the physical world (e.g. latitude, longitude coordinates, etc.). Similarly, the map 180 displays points of interest, such as point of interest 184. The points of interest within the map 180 can be located at positions that correspond to the positions of the points of interest within the physical world. In this manner, the map 180 can be created to provide a representation that corresponds to the geographic area as exists in the physical world.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of displaying map data within a user interface. The method includes identifying, by one or more computing devices, a plurality of points of interest associated with a geographic area to be displayed in a viewport associated with a digital mapping application. The method further includes determining, by the one or more computing devices, an adjusted position for an orientation point of interest, the adjusted position being a position that does not align with a position of the orientation point of interest in the physical world. The method further includes adjusting, by the one or more computing devices, a map topology associated with map data defining a visual representation of the geographic area based at least in part on the adjusted position. The method further includes providing for display, by the one or more computing devices, the orientation POI at the adjusted position associated with the map data within the mapping application.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for displaying map data within a user interface.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to providing a holistic contextual map view associated with a geographic area within a digital mapping environment. The contextual map view can provide an intuitive, point of interest (POI)-based view of the geographic area to a user. The contextual map view can include a plurality of POIs that can be selectively displayed based at least in part on a contextual relevance of the POIs. The contextual map view can display a topology associated with the geographic area that aligns with a user's perception of the geographic area. More particularly, the contextual map view can provide a rendering of the geographic area that can correspond to a view of a user located within the geographic area. The contextual map view can further include temporal information associated with the geographic area. For instance, the contextual map view can provide an expected representation of the geographic area at one or more future times. In some implementations, the contextual map view can further include environmental information associated with the geographic area such as information relating to the weather associated with the geographic area.

More particularly, the contextual map view can include a representation of the geographic area having a flexible topology that is not constrained by the physical dimensions of the geographic area. For instance, such flexible representation can be determined to emphasize or feature one or more orientation POIs. An orientation POI can be a landmark such as a building, bridge, structure, entity, geographic location, or other suitable landmark. Such orientation POI(s) can be displayed in the contextual map view. In some implementations, such orientation POI(s) can be included in the contextual map view representation at positions within the representation that may not exactly align with the corresponding positions of the POI(s) in the physical world. In this manner, an orientation POI can be rendered within the contextual map view at an adjusted position relative to the corresponding position of the POI in the physical world.

In this way the disclosure addresses a technical problem that the screen of a user's device may be not be large enough, when displaying a map of the geographical area with a certain resolution, also to display the orientation POI at a position which exactly aligns with the corresponding positions of the POI in the physical world. This is because the screen of the user's device is typically far smaller than a paper-based map, so that a paper-based map can display a larger geographical area for a given resolution. The disclosure has the technical effect that the orientation POI(s) are rendered despite the limited screen area and without sacrificing the resolution with which the geographical area is rendered.

A plurality of POI representations can be displayed within the contextual map view. The POI representations can be orientation POI representations displayed at an adjusted position or other POI representations located within the geographic area. Such POI representations can be two-dimensional (2D) representations or three-dimensional (3D) representations. In some implementations, one or more of the POI representations displayed in the contextual map view for a geographic area can be 2D representations and one or more of the POI representations can be 3D representations. Such POI representations can depict the physical characteristics of the corresponding POIs. For instance, a 3D POI representation can visually represent the geometric properties of the corresponding POI in a 3D manner.

The plurality of POIs to be displayed within the contextual map view can be selectively determined based at least in part on a ranking or score associated with the POIs. For instance, a corpus of POIs associated with the geographic area can be ranked or scored based at least in part on the popularity, relevance, category, or other suitable metric associated with the POIs. The plurality of POIs to be displayed within the contextual map view can be determined based on such ranking. For instance, the displayed POIs can correspond to POIs ranked or scored higher than a threshold. In some implementations, the displayed POIs can correspond to some number of top ranked or top scored POIs. It will be appreciated that the POIs to be displayed can be determined using any suitable POI selection technique.

As indicated, one or more orientation POIs located outside of the geographic area can be displayed within the contextual map view of the geographic area at an adjusted position. Such display of POIs can be implemented to provide context to the user and/or to simulate a view of the user when standing at some location within the geographic area. For instance, the user, when standing within the geographic area may be able to view a POI that is located outside of the geographic area. Such POI can be displayed within the contextual map view at an adjusted position to simulate the visibility of the POI. Such POIs can be used to orient the user, such that the contextual map view corresponds to the user's view of the physical world.

In this manner, selecting such orientations POIs to be displayed can include analyzing one or more POIs located outside of the geographic area. For instance, POIs located within a surrounding area located within a threshold distance from the geographic area can be identified. One or more of the POIs located within the surrounding area can be selected to be displayed within the contextual map view associated with the geographic area. A representation of the selected POIs can be rendered at adjusted positions within the geographic area. In some implementations, the topology of the map of the geographic area can be adjusted in conjunction with rendering the selected POIs at the adjusted positions. For instance, the map topology can be generalized by removing one or more features associated with the map. Such features can include POIs, geographic areas, geographic structures, map terrain, map geometry, entities, buildings, roads, paths, etc. Such features can be features located proximate the adjusted position at which the orientation POI is to be rendered. In this manner, the orientation POI can be rendered in place of the removed features. Such topology generalization can be performed to remove clutter from the contextual map view associated with the orientation POI(s), and to facilitate a more intuitive view of the map.

As indicated, the contextual map view can depict the geographic area from a particular viewpoint determined based at least in part on the selected POIs to be displayed in the contextual map view. The viewpoint can be determined to encompass an interesting or relevant view of the geographic area as defined by the selected POIs. For instance, once the POIs to be displayed have been selected, a viewpoint can be determined based at least in part on the POIs. More particularly, the viewpoint can be determined such that at least a subset of the selected POIs is displayed in the contextual map view. In this manner, the viewpoint can be determined independently from a cardinal direction scheme. The viewpoint can correspond to an orientation of a virtual camera associated with the geographic area. For instance, the viewpoint can correspond to an angle and/or position of the virtual camera. In this manner, the contextual map view can include a rendering of map data associated with the geographic area from the determined viewpoint.

In some implementations, the POIs to be displayed can be selected based at least in part on temporal information associated with the POIs. For instance, the POIs to be displayed can be selected based on operating hours associated with the POIs. As another example, the POIs to be displayed can be selected based at least in part on a temporal relevance of the POI. For instance, a restaurant that serves breakfast may be displayed in a contextual map view associated with breakfast time. Similarly, a bar or other late night "hotspot" can be displayed in a contextual map view associated with late night.

For instance, in some implementations, the contextual map view can include a plurality of panes, each depicting the geographic area. Each pane can correspond to a particular time of day. The panes can be interactive, such that a user can switch between the panes to view relevant temporal information associated with the geographic area at the time of day associated with the panes. For instance, the contextual map view can include a first pane associated with a current time, a second pane associated with a first future time, and a third pane associated with a second future time. The panes can each display POI(s) associated with the geographic area. In some implementations, the POI(s) displayed within each pane can vary based at least in part on the time of day associated with the pane. For instance, the first pane can display POI(s) that are relevant at the current time, the second pane can display POI(s) that are relevant at the first future time, and the third pane can display POI(s) that are relevant at the second future time.

As indicated, the contextual map view can further include environmental information associated with the geographic area. The environmental information can include weather information, traffic information, transportation information (e.g. routes, public transportation scheduling, etc.), or other suitable information associated with the geographic area. In implementations, wherein a plurality of map panes are associated with a plurality of times of day, the environmental information can be associated with the time of day associated with the map pane. For instance, the first pane described above can include environmental information associated with the current time, the second pane can include environmental information associated with the first future time and the second pane can include environmental information associated with the second future time.

In some implementations, the environmental information can be represented graphically within the contextual map view. For instance, the weather information can be displayed graphically within the contextual map view. More particularly, the weather information can be provided via graphical representations of weather elements indicative of the weather information, such as a sun, moon, rain, snow, clouds, etc. corresponding to the weather information displayed within contextual map view. For instance, the contextual map view can display the geographic area from a viewpoint that allows a representation of the sky to be displayed within the contextual map view. Such weather elements can be displayed within the displayed sky.

Figure 2:
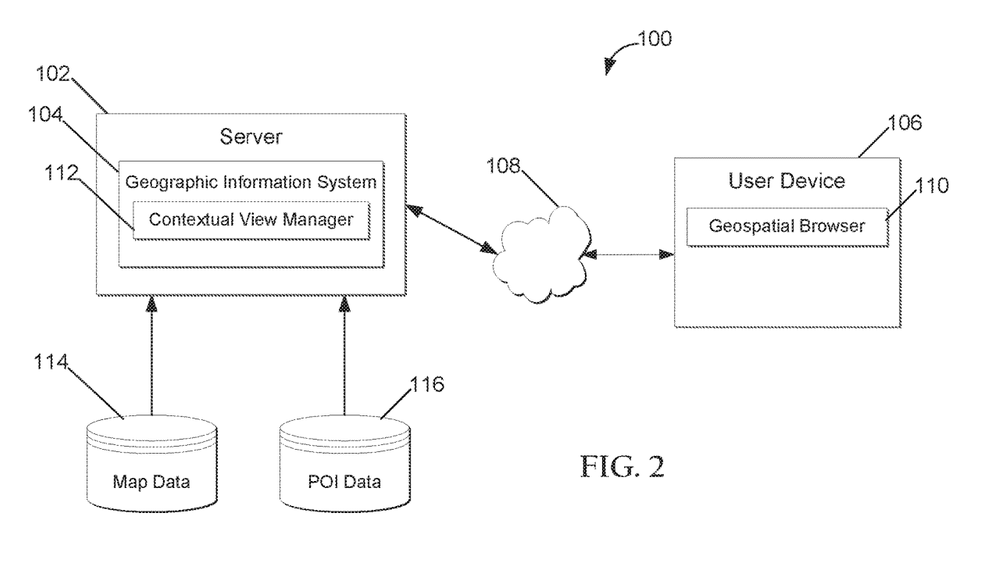
FIG. 2 depicts an example system for providing a contextual map view according to example embodiments of the present disclosure.

With reference now to the figures, example aspects of the present disclosure will be discussed in greater detail. For instance, FIG. 2 depicts an overview of an example system 100 of providing a contextual map view to a user. The system 100 includes a server 102. The server 102 can host a geographic information system (GIS) 104. The server 102 can communicate with a user device 106, for instance, via a network 108. The user device 104 can be any suitable computing device, such as a desktop, laptop, smartphone, mobile device, tablet, wearable computing device, navigation system, display with one or more processors, etc. The GIS 104 can implement a mapping application, a virtual globe application, or any other suitable GIS. The GIS 104 can provide for the archiving, retrieving, and manipulation of geospatial data that has been indexed and stored according to geographic coordinates, such as latitude, longitude, and altitude coordinates, associated with the geospatial data. The GIS 104 can combine satellite imagery, photographs, maps, models, and other geographic data, and Internet search capability so as to enable a user to view imagery of the planet (e.g. map data associated with a plurality of geographic areas) and related geographic information (e.g., locales such as islands and cities, and points of interest such as local restaurants, hospitals, parks, hotels, and schools). The GIS 104 further allows the user to conduct local searches and/or to get travel directions to a location or between two locations. The user can virtually fly from space (e.g., some vantage point above the Earth) to and around an entered target address or location, such as a neighborhood or other area of interest. Results can be displayed in a two-dimensional or three-dimensional representation of the area of interest. In some the user can pan, tilt, and rotate the view to see three-dimensional terrain and buildings.

The GIS 104 can further allow a user to annotate maps, and/or enable data layers to show, for example, parks, schools, hospitals, airports, shopping, and other points of interest or locales. The GIS 104 can further allow the user to layer multiple searches, save results to folders, and share search results and maps with others. An exemplary graphical user interface allowing the user to interact with the system will be discussed with reference to FIG. 2.

The user device 106 can include a geospatial browser 110 (or other suitable viewer) that acts as an interface between the user device 106 and the GIS 104. For instance, the geospatial browser can be configured to display digital map data. A user of the user device 106 can interact with the geospatial browser 110 to facilitate interactions between the user device 106 and the GIS 104. The geospatial browser can implement a user interface for viewing geographic data (e.g. digital map data). The user interface can include a plurality of user interface elements with which the user can interact to facilitate communications between the user device 106 and the GIS 104.

According to example aspects of the present disclosure, the geospatial browser 110 can be configured to display a contextual map view of a geographic area. As indicated, such contextual map view can facilitate a more intuitive user experience for a user viewing the geospatial browser 110. In this manner, the user device 106 can communicate with the server 102 to facilitate a provision of the contextual map view to the user. The geographic information system 104 can include a contextual view manager 112. The contextual view manager 112 can be configured to determine a contextual map view associated with a geographic area. For instance, the geographic area can be a geographic area to be displayed within a viewport of the geospatial browser 110 on the user device 106. In some implementations, the user can select the geographic area through an interaction with the geospatial browser 110. Such interaction can be any suitable interaction such as panning, zooming, etc. with respect to the geospatial browser 110 such that the geospatial browser 110 is to display the geographic area. In some implementations, the geographic area can be displayed within the viewport in response to a search query provided by the user.

The contextual view manager 112 can access map data 114 and/or POI data 116 to determine a contextual map view associated with the geographic area. For instance, the contextual view manager 112 can access POI data 116 to determine one or more POIs to be displayed within the contextual map view. The POIs can include any suitable building, structure, geographic area, entity, landmark, or other suitable POI. The POI data 116 can include data indicative of a plurality of POIs located within the geographic area. The POI data 116 can further include data indicative of a plurality of POIs located outside of the geographic area in one or more surrounding areas relative to the geographic area. The data indicative of the POIs can include data associated with graphical representations of the POIs to be rendered within the contextual map view. The data indicative of the POIs can further include metadata or other data describing one or more characteristics of the POIs. Such metadata can include one or more rankings or scores, user reviews, location data, operating hours, menus, check-in data, and/or other suitable data associated with the respective POIs.

The contextual view manager 112 can select the POIs to be displayed within the contextual map view based at least in part on the data indicative of the POIs (e.g. the metadata associated with the POIs). For instance, the contextual view manager 112 can select the POIs to be displayed based at least in part on the rankings associated with the POIs. The contextual view manager 112 can select the POIs to be displayed using any suitable POI selection technique or strategy. In some implementations, the POIs to be displayed can be selected based at least in part on temporal information associated with the POIs. For instance, the selected POIs can be POIs that are relevant to a particular time or time range associated with the contextual map view.

The contextual view manager 112 can further determine one or more orientation POIs to be displayed within the contextual map view. An orientation POI can be any suitable POI. For instance, an orientation POI can be a prominent structure (e.g. bridge), building, landmark etc. An orientation POI can be a POI that can provide geospatial context to the user. In some implementations, an orientation POI can be a POI that is not located within the geographic area to be represented within the viewport. For instance, an orientation POI can be a POI that is located outside the geographic area, but within a threshold distance of the geographic area. In this manner, the contextual view manager 112 can identify data indicative of a plurality of candidate orientation POIs (e.g. from the POI data 116) that are located within the threshold distance of the geographic area. The contextual view manager 112 can select one or more orientation POIs to be displayed within the geographic area at adjusted positions. In this manner, the contextual view manager 112 can select the orientation POI(s) based at least in part on the data indicative of the candidate orientation POIs. In some implementations, the orientation POIs may be predetermined. In such implementations, when a predetermined orientation POI is located within the threshold distance of the geographic area, the contextual view manager 112 can facilitate the display of the orientation POI at an adjusted position within the geographic area displayed by the geospatial browser 110.

In particular, upon the selection and/or determination of an orientation POI, the contextual view manager can be configured to determine an adjusted position for the POI within the geographic area. The adjusted position of the orientation POI can be a position data does not align with the corresponding position of the orientation POI in the physical world. The adjusted position can be determined such that the orientation POI can be displayed within the geographic area by the geospatial browser 110. The adjusted position can be any suitable position within the geographic area.

Upon a determination of the adjusted position, the contextual view manager 112 can determine map data associated with the geographic area to be displayed by the geospatial browser 110. For instance, the contextual view manager 112 can access map data 114 to determine the map data to be displayed. In this manner, the contextual view manager 112 can obtain map data depicting the geographic area. The map data 114 can be any suitable map data.

In some implementations, the contextual view manager 112 can adjust the obtained map data to facilitate a rendering of the orientation POI at the adjusted position. For instance, in some implementations, the contextual view manager 112 can adjust the topology of the map to remove, adjust, rearrange, edit, resize, etc. one or more features of the map. Such features can include any suitable features, such as any suitable element, component, mass, terrain, item, characteristic, facet, etc. of the map data. In some implementations, the features to be adjusted can be features located proximate the adjusted position at which the orientation POI is to be displayed. Once the map data has been adjusted to facilitate the rendering of the orientation POI, the orientation POI can be added to the map data. In this manner, the map data can be adjusted to add the orientation POI to the map data at the adjusted position.

The contextual view manager 112 can further be configured to determine a viewpoint from which the map associated with the geographic area is to be displayed. The viewpoint can be determined based at least in part on the POIs to be displayed within the contextual map view. For instance, the viewpoint can be determined such that a suitable number of POIs are displayed. In some implementations, the viewpoint can be determined such that the orientation POI can be displayed within the contextual map view. In general, the viewpoint can be determined to provide the user with an intuitive, contextual view of the geospatial area associated with the geographic area. In some implementations, the viewpoint can be determined n conjunction with the determination of the POIs to be displayed, such that the display of the POIs within the geographic area from the determined viewpoint can provide the user with information associated with the geographic area that captures the interesting qualities or characteristics of the geographic area.

The geographic information system 104 can provide the adjusted map data and/or data indicative of one or more POIs to be displayed within the contextual map view to the user device 106. The geospatial browser 110 can then render the map data and/or the one or more POIs within the viewport of the geospatial browser. In particular, the geospatial browser 110 can render the map data from a perspective associated with the determined viewpoint.

In some implementations, the contextual map view can include multiple "panes," each depicting a contextual view of the geographic area. Each pane can correspond to a different time of day. In this manner, the contextual view manager 112 can determine a plurality of POIs to be displayed in each pane. The POIs associated with each pane can be determined based at least in part on the time associated with the pane. More particularly, the POIs can be determined based at least in part on the operating hours associated with the POIs, or other suitable data associated with the POIs indicative of a temporal relevance of the POIs. For instance, the contextual view manager 112 can determine a first set of POIs for a first pane associated with a first time. The first set of POIs can be determined based at least in part on the first time, such that the determined POIs are relevant to the first time. The contextual view manager 112 can determine a second set of POIs for a second pane associated with a second time. The second set of POIs can be determined based at least in part on the second time, such that the determined POIs are relevant to the second time.

In some implementations, the contextual view manager 112 can further determine environmental information to be displayed within the contextual map view. Such environmental information can include weather information, traffic information, transportation information, or other suitable information associated with the geographic area. The environmental information can be represented graphically within the contextual map view. For instance, one or more weather elements (e.g. graphical representations of weather events, such as rain, snow, sunshine, moonlight, etc.) can be determined based at least in part on a current real-time environmental information associated with the geographic area in the physical world. In this manner the contextual view manager 112 can obtain environmental information currently associated with the geographic area. Such environmental information can be obtained from any suitable source. In implementations wherein the contextual map view includes multiple panes associated with multiple times, each pane can include environmental information associated with the respective associated times.

Figure 3:
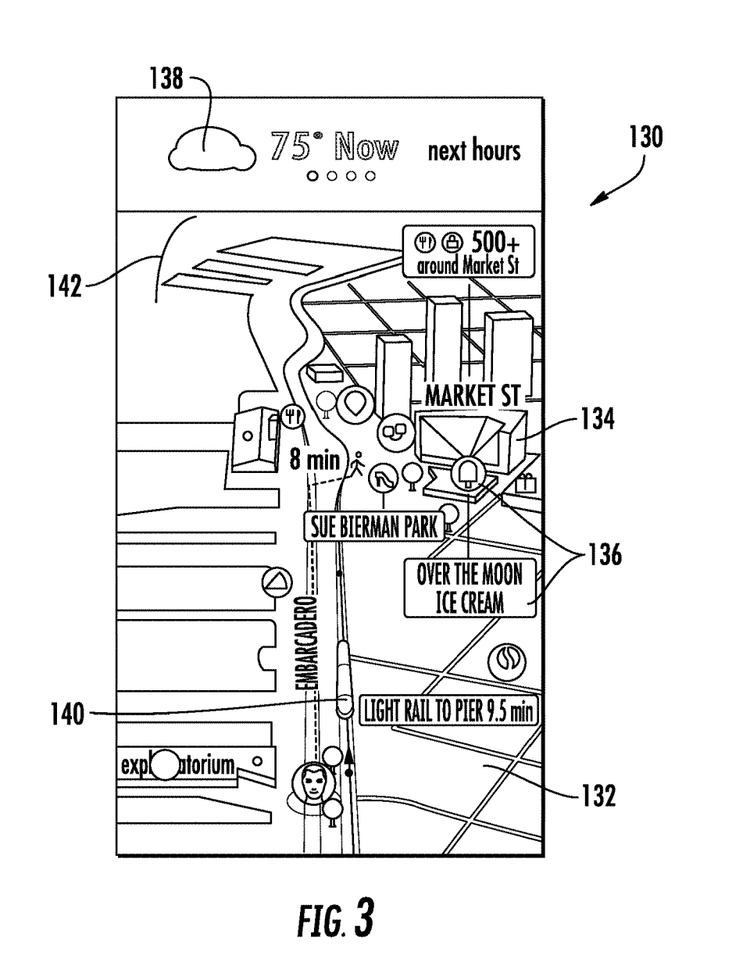
FIG. 3-5 depict example user interfaces displaying contextual map views according to example embodiments of the present disclosure.

FIG. 3 depicts an example user interface displaying a contextual map view 130 associated with a geographic area. The contextual map view 130 can be displayed within a user interface associated with a digital mapping application. As shown, the contextual map view 130 includes a map topology 132 and POIs 134. As shown, the POIs 134 can be 3D POIs that depict a 3D representation of the POIs within the contextual map view 130. In some implementations, at least one POI 134 can be a 2D POI that depicts a 2D representation of the POIs within the contextual map view. The contextual map view 130 further includes annotations 136. An annotation 136 can be a label, icon, etc. that provides information associated with one or more components of the contextual map view 130. For instance, an annotation 136 can provide information relating to a POI 134.

The contextual map view can further display environmental information associated with the geographic area. For instance, the environmental information can include weather information 138, transportation information 140, and/or other suitable environmental information. As shown, the transportation information includes route data associated with various suitable modes of transportation available to a user. The annotations 136 can further provide information associated with the transportation information 140.

The contextual map view 130 depicts the geographic area from a viewpoint determined according to example aspects of the present disclosure. The viewpoint can be defined by a position and orientation of a virtual camera that defines the map data to be displayed. The position and orientation can be defined by a tilt angle and/or an azimuth angle associated with the virtual camera. As shown, the viewpoint can be an oblique viewpoint that can attempt to facilitate a more intuitive view of the geographic area to the user. As indicated, the viewpoint can be dependent on the POIs 134 displayed within the contextual map view 130. For instance, in some implementations, the viewpoint can be determined such that contextual map view 130 includes the POIs 134 that have been selected for display.

Figure 4:
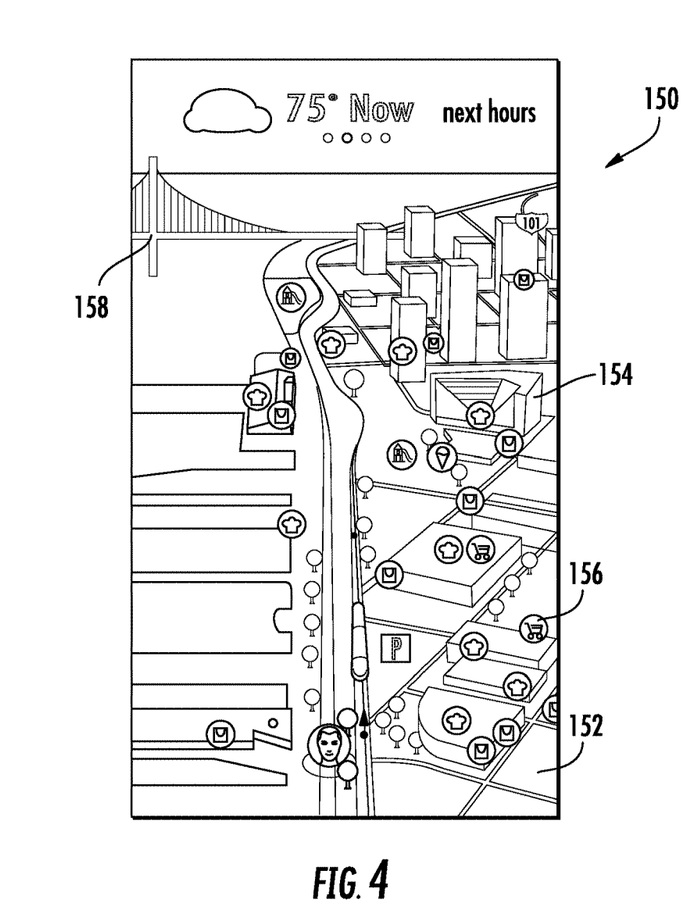

FIG. 4 depicts an example user interface that depicts a contextual map view 150 according to example aspects of the present disclosure. Similar to the contextual map view 130, the contextual map view 150 depicts a map topology 152 of a geographic area. As shown, the geographic area associated with the contextual map view 150 corresponds to the geographic area associated with the contextual map view 130. The contextual map view 150 depicts a plurality of POIs 154 determined according to example aspects of the present disclosure, and annotations 156 associated with a plurality of map components.

The contextual map view 150 further includes an orientation POI 158. As shown, the orientation POI 158 is a bridge structure. It will be appreciated that various other orientation POIs can be used. The orientation POI 158 is depicted at an adjusted position with respect to the map topology 152 relative to the location of the corresponding orientation POI in the physical world. As shown, the contextual map view 150 includes a generalized topology relative to the contextual map view 130. In particular, features 142 included within the contextual map view 130 have been removed from the contextual map view 150 to accommodate the rendering of the orientation POI 158 at the adjusted position. Such features 142 can be features located at or near the adjusted position. As indicated above, the adjusted position can be determined based at least in part on the geographic area and the orientation POI 158. More particularly, the adjusted position can be determined to facilitate a rendering of the orientation POI 158 within the contextual map view 150, such that the contextual map view 150 provides a geospatially intuitive view of the geographic area. In this manner, the depiction of the orientation POI 158 can help the user to gain a better understanding of the geographic area as depicted in the in the contextual map view 150.

Figure 5:
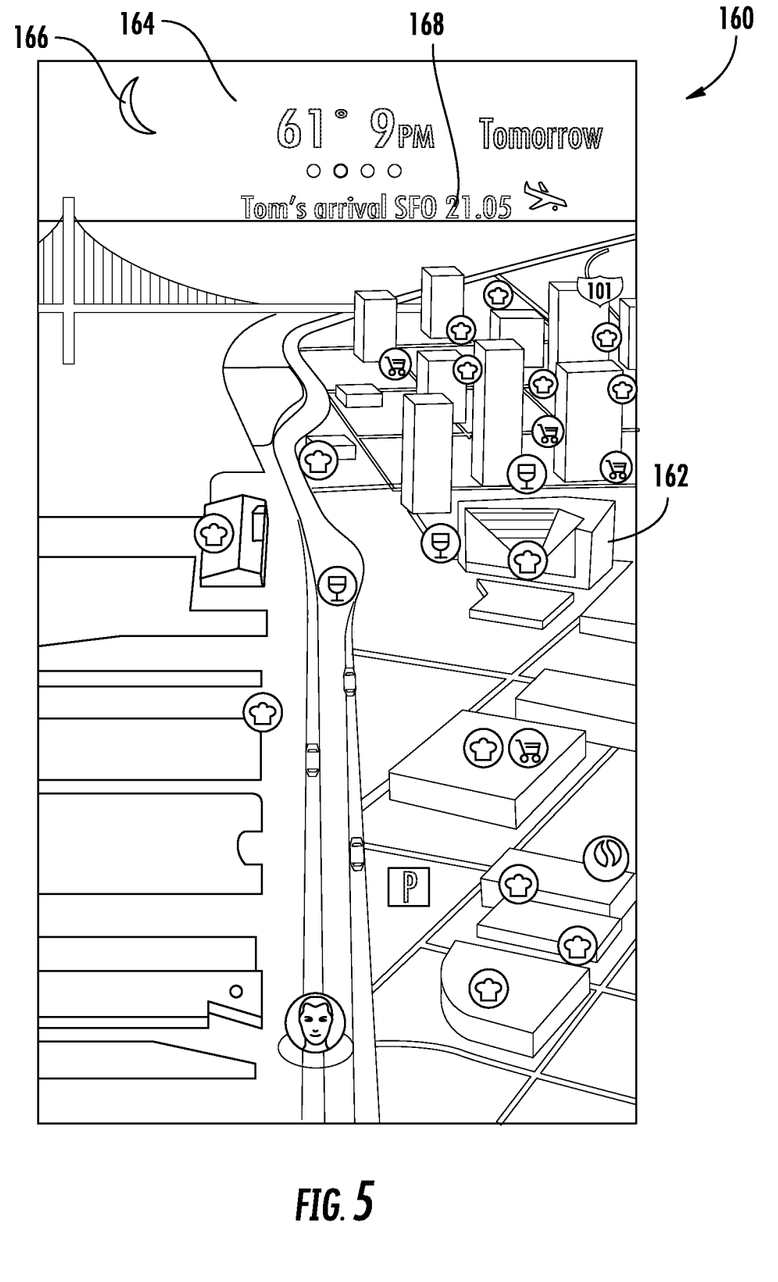

FIG. 5 depicts an example user interface that displays a contextual map view 160 according to example embodiments of the present disclosure. The contextual map view 160 is associated with a future time (e.g. 9:00 PM) relative to the current time at which the contextual map view 160 is displayed. Similar to the contextual map views 130 and 150, the contextual map view 160 can include a plurality of POIs 162. The plurality of POIs 162 that are displayed can be determined based at least in part on the future time. For instance, the POIs 162 can be POIs that are relevant to the future time. In this manner, the POIs 162 can be a different set of POIs than a set of POIs that may be displayed for a different time, such as the current time. The contextual map view 160 can further include environmental information, such as weather information 164. The weather information 164 can include an expected temperature at the future time. The weather information 164 can further include a graphical representation of one or more characteristics of the expected weather. For instance, the weather information 164 includes a graphical representation of the moon 166. Such graphical representation 166 can correspond to an actual visibility of the moon at the future time. As shown, the color scheme of the contextual map view 160 can be configured to correspond to the future time (e.g. night time).

The contextual map view 160 further includes calendar data 168. The calendar data can be obtained from one or more calendars or schedules associated with the user. In some implementations, the future time can be determined based at least in part on the user's calendar(s). For instance, an upcoming event specified by the calendar(s) can be identified, and the future time can be determined to correspond to the time of the upcoming event.

In some implementations, the contextual map view 160 can include a plurality of panes to which the user can selectively navigate. The panes can each depict the geographic area (e.g. a map topology, POIs, etc.). The panes can each be associated with a particular time. For instance, the contextual map view 150 can be a first pane associated with current time (e.g. "Now") and the contextual map view 160 can be a second pane associated with the future time. The user can navigate to each pane by interacting with a user interface associated with the contextual map views. For instance, the user can perform a touch gesture on a display device to "swipe" to each pane. It will be appreciated that any suitable interaction can be used to navigate among the panes.

Figure 6:
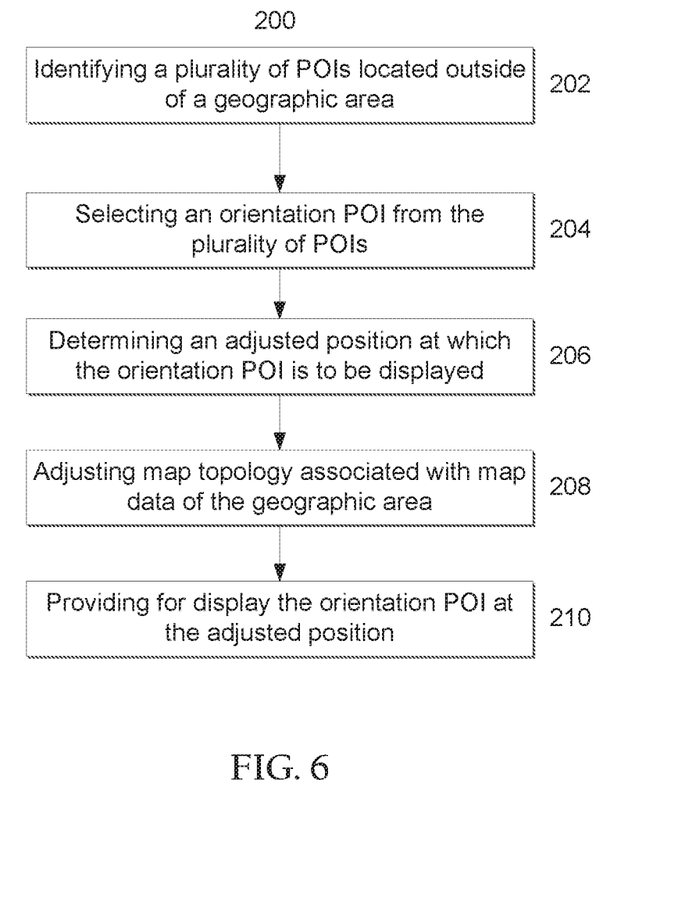
FIG. 6 depicts a flow diagram of an example method of displaying an orientation point of interest according to example embodiments of the present disclosure.

FIG. 6 depicts a flow diagram of an example method (200) of displaying an orientation POI according to example embodiments of the present disclosure. The method (200) can be implemented by one or more computing devices, such as one or more of the computing devices depicted in FIG. 9. In addition, FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), the method (200) can include determining a plurality of POIs to be displayed within a contextual map view associated with a geographic area. The POIs can be located outside of the geographic area. More particularly, the POIs can be located within a threshold distance of the geographic area. For instance, the contextual map view can correspond to any of the contextual map views 130, 150, or 160 depicted in FIGS. 3, 4, and 5, respectively or other contextual map view. The POIs can be determined based at least in part on metadata or other data associated with the POIs. For instance, such metadata can include rankings or scores, user reviews, location data, operating hours, menus, and/or other suitable data associated with the respective POIs. The POIs can be determined, for instance, based on a relevance of the POIs to the geographic area. In this manner, the POIs can be determined using any suitable POI selection strategy or technique to determine a set of POIs that are interesting, relevant, noteworthy, popular, etc. within the geographic area. In some implementations, the POIs can be determined based at least in part on a time associated with the contextual map view.

At (204), the method (200) can include selecting an orientation POI from the plurality of POIs. An orientation POI can be a POI that can be displayed within the contextual map view to help provide geospatial information associated with the geographic area to the user. As indicated, in some implementations, the orientation POI can be located outside of the geographic area. The orientation POI can be a prominent or well-known POI, such as a famous building, landmark, structure, etc. In some implementations, the orientation POI can be a POI that can be seen from a great distance. For instance, a user standing within the geographic area may still be able to view the orientation POI in the physical world although the orientation POI is located outside of the geographic area.

At (206), the method (200) can include determining an adjusted position at which the orientation POI is to be displayed. The adjusted position can be a position located within the geographic area. In some implementations, the adjusted position can be determined based at least in part on a viewpoint from which the geographic area is to be depicted in the contextual map view. The adjusted position can be a position that does not align with the corresponding position of the orientation POI in the physical world. In this manner, the adjusted position can be a position within the contextual map view such that, when the orientation POI is rendered at the adjusted position, the orientation POI provides the user with a geospatial context associated with the geographic area. Such geospatial context can be intended to simulate a view of the user while standing within the geographic area.

At (208), the method (200) can include adjusting a map topology associated with map data of the geographic area. For instance, the map data can include data indicative of the map topology that defines a 2D representation of the geographic area. The map topology can include a plurality of features that collectively define the 2D representation. The features can include streets, paths, structures, terrain, entities, bodies of water, or other suitable features. Adjusting the map topology can include removing, rearranging, editing, resizing, moving, or otherwise adjusting one or more map features. For instance, the one or more adjusted features can be features located at or near (e.g. within a threshold distance) the adjusted position. In this manner, the map topology can be adjusted by adjusting one or more map features to accommodate the rendering of the orientation POI within the contextual map view.

At (210), the method can include providing for display the orientation POI at the adjusted position within the contextual map view. For instance, a representation of the orientation POI can be rendered at the adjusted position within the contextual map view. In this manner, the map data associated with the geographic area can be displayed along with the orientation POI. The orientation POI can be displayed at the adjusted position with respect to the map data.

Figure 7:
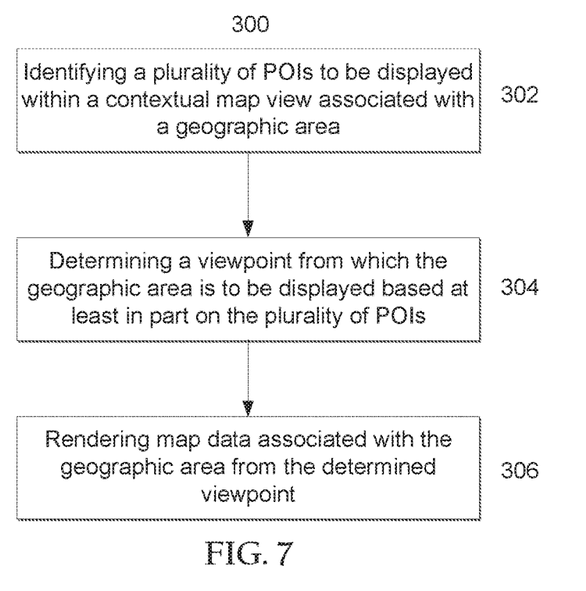
FIG. 7 depicts a flow diagram of an example method of determining a viewpoint associated with a contextual map view according to example embodiments of the present disclosure.

FIG. 7 depicts a flow diagram of an example method (300) of determining a viewpoint for a contextual map view according to example embodiments of the present disclosure. The method (300) can be implemented by one or more computing devices, such as one or more of the computing devices depicted in FIG. 9. In addition, FIG. 7 depicts steps performed in a particular order for purposes of illustration and discussion.

At (302), the method (300) can include identifying a plurality of POIs to be displayed within a contextual map view associated with a geographic area. The contextual map view can correspond to any of the contextual map views 130, 150, or 160 depicted in FIGS. 3, 4, and 5, respectively or other contextual map view. The POIs can be determined according to example aspects of the present disclosure.

At (304), the method (300) can include determining a viewpoint from which the geographic area is to be displayed based at least in part on the plurality of POIs. For instance, the viewpoint can be defined by a tilt angle and an azimuth angle associated with a virtual camera that defines the perspective of the contextual map view. The viewpoint can be determined such that each POI can be depicted within the contextual map view. In some implementations, the viewpoint can be determined, such that an orientation POI in accordance with example aspects of the present disclosure can be depicted within the contextual map view. More generally, the viewpoint can be determined to provide a view of the geographic area that captures relevant, interesting, or noteworthy characteristics of the geographic area (e.g. relevant POIs determined according to example aspects of the present disclosure).

At (306), the method (300) can include rendering map data associated with the geographic area from the determined viewpoint. The map data can be any suitable map data associated with the geographic area. More particularly, the map data can be rendered from a perspective of the tilt angle and the azimuth angle associated with the viewpoint. In this manner, the contextual map view can depict the geographic area from a perspective of a virtual camera that captures an image of the geographic area from the viewpoint relative to the geographic area.

Figure 8:
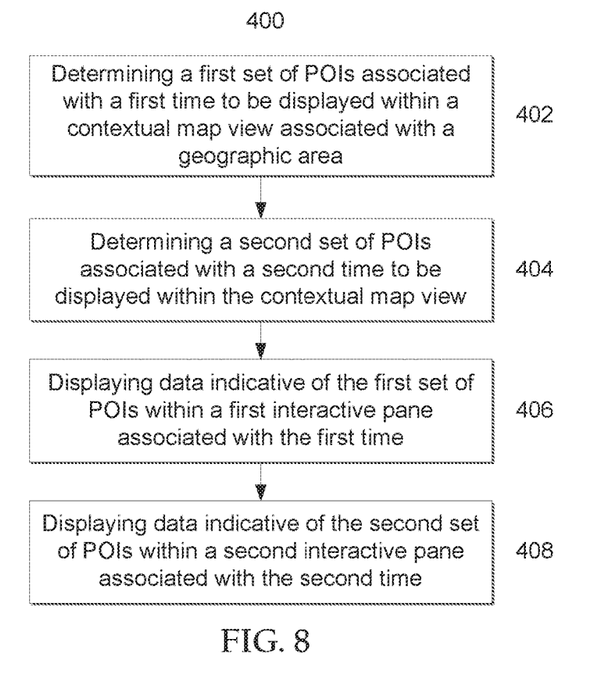
FIG. 8 depicts a flow diagram of an example method of providing a multi-paned contextual map view associated with multiple times according to example embodiments of the present disclosure.

FIG. 8 depicts a flow diagram of an example method (400) of providing a contextual map view associated with multiple times according to example embodiments of the present disclosure. The method (400) can be implemented by one or more computing devices, such as one or more of the computing devices depicted in FIG. 9. In addition, FIG. 8 depicts steps performed in a particular order for purposes of illustration and discussion.

At (402), the method (400) can include determining a first set of POIs associated with a first time to be displayed within a contextual map view associated with a geographic area. The first set of POIs can be determined based at least in part on the first time, such that the first set of POIs are relevant to the first time. In this manner, the first set of POIs can be determined based at least in part on operating hours associated with the POIs, check-in data associated with the POIs, popularity data associated with the POIs, etc.

At (404), the method (400) can include determining a second set of POIs associated with a second time to be displayed within the contextual map view. The second time can be a different time than the first time. For instance, the second time can be a future time relative to the first time. The second set of POIs can be determined based at least in part on the second time, such that the second set of POIs are relevant to the second time.

At (406), the method (400) can include displaying data indicative of the first set of POIs within a first interactive pane associated with the contextual map view. The first pane can be associated with the first time. In this manner, the first pane can display a representation of the geographic area associated with the first time. The data indicative of the first set of POIs can include graphical representations of the POIs that are located at a position within the contextual map view that corresponds to the position of the corresponding POIs in the physical world. The data indicative of the first set of POIs can further include icons, labels, annotations, etc. associated with the POIs that provide information associated with one or more characteristics of the respective POIs.

At (408), the method (400) can include displaying data indicative of the second set of POIs within a second interactive pane associated with the contextual map view. The second pane can be associated with the second time. In this manner, the second pane can display a representation of the geographic area associated with the second time. The data indicative of the second set of POIs can include graphical representations of the POIs that are located at a position within the contextual map view that corresponds to the position of the corresponding POIs in the physical world. The data indicative of the second set of POIs can further include icons, labels, annotations, etc. associated with the POIs that provide information associated with one or more characteristics of the respective POIs. The second set of POIs can be different than the first set of POIs.

As indicated, the panes of the contextual map view can be navigable by a user, such that the user can interact with the user interface displaying the contextual map view to navigate to the panes. It will be understood that any suitable number of panes can be included within the contextual map view, associated with any suitable number of times.

Figure 9:
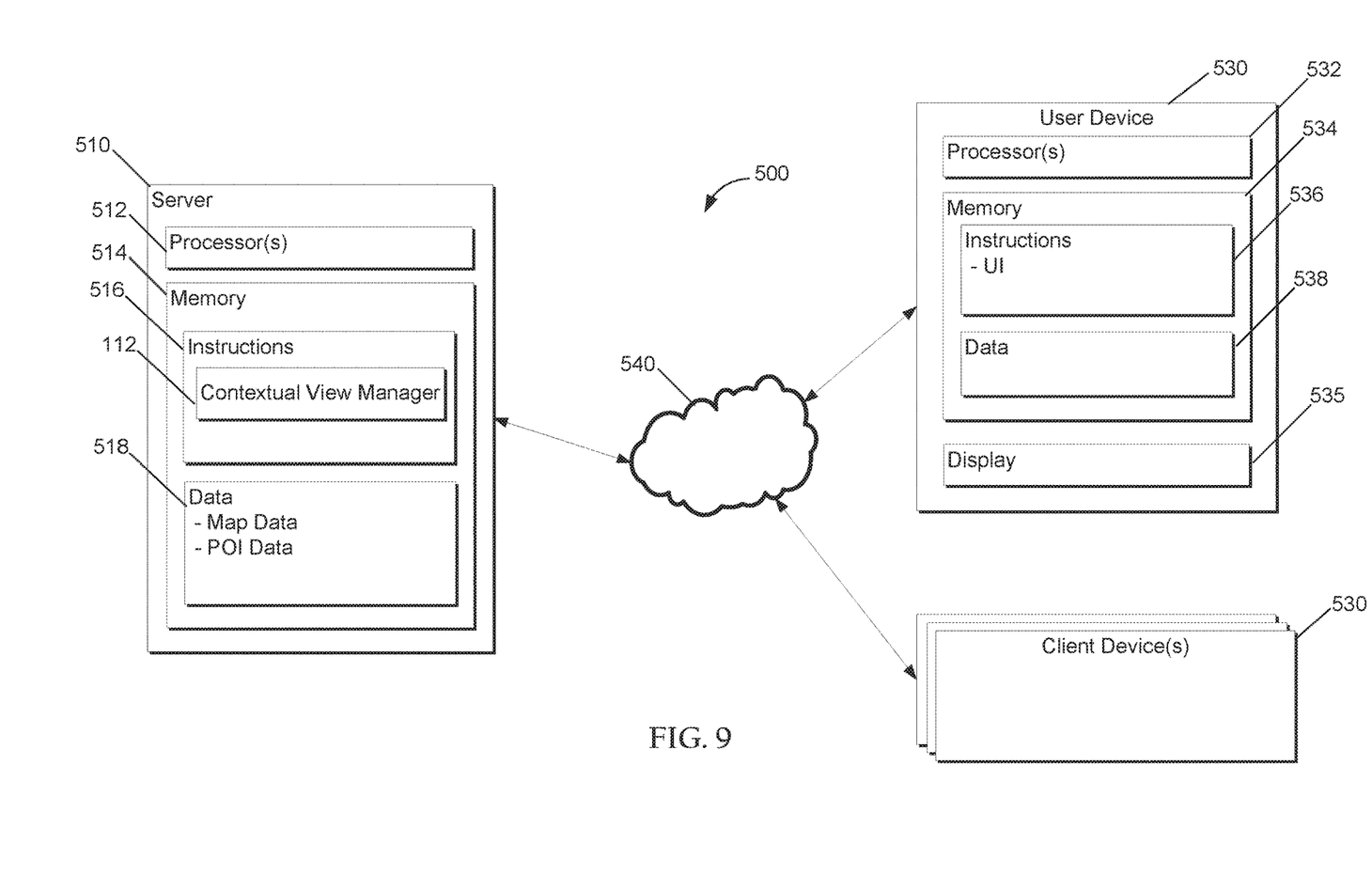
FIG. 9 depicts an example system according to example embodiments of the present disclosure.

FIG. 9 depicts an example computing system 500 that can be used to implement the methods and systems according to example aspects of the present disclosure. The system 500 can be implemented using a client-server architecture that includes a server 510 that communicates with one or more client devices 530 over a network 540. The system 500 can be implemented using other suitable architectures, such as a single computing device.

The system 500 includes a server 510, such as a web server. The server 510 can host a geographic information system, such as a geographic information system associated with a mapping service. The server 510 can be implemented using any suitable computing device(s). The server 510 can have one or more processors 512 and one or more memory devices 514. The server 510 can also include a network interface used to communicate with one or more client devices 530 over the network 540. The network interface can include any suitable components for interfacing with one more networks, including for example, transmitters, receivers, ports, controllers, antennas, or other suitable components.

The one or more processors 512 can include any suitable processing device, such as a microprocessor, microcontroller, integrated circuit, logic device, or other suitable processing device. The one or more memory devices 514 can include one or more computer-readable media, including, but not limited to, non-transitory computer-readable media, RAM, ROM, hard drives, flash drives, or other memory devices. The one or more memory devices 514 can store information accessible by the one or more processors 512, including computer-readable instructions 516 that can be executed by the one or more processors 512. The instructions 516 can be any set of instructions that when executed by the one or more processors 512, cause the one or more processors 512 to perform operations. For instance, the instructions 516 can be executed by the one or more processors 512 to implement a contextual view manager 112 described with reference to FIG. 1.

As shown in FIG. 9, the one or more memory devices 514 can also store data 518 that can be retrieved, manipulated, created, or stored by the one or more processors 512. The data 518 can include, for instance, mapping data, POI data, and other data. The data 518 can be stored in one or more databases. The one or more databases can be connected to the server 510 by a high bandwidth LAN or WAN, or can also be connected to server 510 through network 540. The one or more databases can be split up so that they are located in multiple locales.

The server 510 can exchange data with one or more client devices 530 over the network 540. Although two client devices 530 are illustrated in FIG. 9, any number of client devices 530 can be connected to the server 510 over the network 540. Each of the client devices 530 can be any suitable type of computing device, such as a general purpose computer, special purpose computer, laptop, desktop, mobile device, navigation system, smartphone, tablet, wearable computing device, a display with one or more processors, or other suitable computing device.

Similar to the server 510, a client device 530 can include one or more processor(s) 532 and a memory 534. The one or more processor(s) 532 can include one or more central processing units (CPUs), graphics processing units (GPUs) dedicated to efficiently rendering images or performing other specialized calculations, and/or other processing devices. The memory 534 can include one or more computer-readable media and can store information accessible by the one or more processors 532, including instructions 536 that can be executed by the one or more processors 532 and data 538. For instance, the memory 534 can store instructions 536 for implementing a user interface module for displaying contextual map views determined according to example aspects of the present disclosure.

The client device 530 of FIG. 9 can include various input/output devices for providing and receiving information from a user, such as a touch screen, touch pad, data entry keys, speakers, and/or a microphone suitable for voice recognition. For instance, the client device 530 can have a display device 535 for presenting a user interface displaying contextual map views according to example aspects of the present disclosure.

The client device 530 can also include a network interface used to communicate with one or more remote computing devices (e.g. server 510) over the network 540. The network interface can include any suitable components for interfacing with one more networks, including for example, transmitters, receivers, ports, controllers, antennas, or other suitable components.

The network 540 can be any type of communications network, such as a local area network (e.g. intranet), wide area network (e.g. Internet), cellular network, or some combination thereof. The network 540 can also include a direct connection between a client device 530 and the server 510. In general, communication between the server 510 and a client device 530 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of displaying map data within a user interface, the method comprising:
identifying, by one or more computing devices, a plurality of points of interest associated with a geographic area to be displayed as a map view in a viewport associated with a digital mapping application;
determining, by the one or more computing devices, an adjusted position for an orientation point of interest which in the physical world is outside the geographic area, the adjusted position being a position within the geographic area that does not align with a position of the orientation point of interest in the physical world;
adjusting, by the one or more computing devices, a map topology associated with map data defining a visual representation of the geographic area based at least in part on the adjusted position, wherein the adjusting the map topology comprises resizing the orientation point of interest and removing one or more features of the map that are proximate to the adjusted position; and
providing for display, by the one or more computing devices, within the mapping application, a map view representing the geographic area, the representation including the orientation point of interest at the adjusted position associated with the map data, whereby the orientation point of interest is shown within the geographic area.

2. The computer-implemented method of claim 1, wherein identifying, by the one or more computing devices, a plurality of points of interest comprises identifying the orientation point of interest.

3. The computer-implemented method of claim 1, wherein the orientation point of interest is located outside of the geographic area.

4. The computer-implemented method of claim 1, wherein the orientation point of interest is located within a threshold distance of the geographic area.

5. The computer-implemented method of claim 1, wherein identifying, by one or more computing devices, a plurality of points of interest comprises identifying the points of interest based at least in part on metadata respectively associated with the points of interest.

6. The computer-implemented method of claim 1, wherein the adjusted position is located within the geographic area.

7. The computer-implemented method of claim 1, wherein adjusting, by the one or more computing devices, a map topology comprises removing, adjusting, rearranging, or editing one or more map features associated with the map topology.

8. The computer-implemented method of claim 7, wherein the one or more map features are determined based at least in part on the adjusted position.

9. The computer-implemented method of claim 7, wherein adjusting, by the one or more computing devices, a map topology comprises removing one or more map features, the one or more removed map features being selected as map features which are proximate to the adjusted position according to a proximity criterion.

10. A computing system comprising:
one or more processors;
one or more non-transitory computer-readable media storing instructions that when executed by the one or more processors cause the one or more processors to perform operations, the operations comprising:
identifying a plurality of points of interest associated with a geographic area to be displayed as a map view in a viewport associated with a digital mapping application;

determining an adjusted position for an orientation point of interest which in the physical world is outside the geographic area, the adjusted position being a position within the geographic area that does not align with a position of the orientation point of interest in the physical world;

adjusting a map topology associated with map data defining a visual representation of the geographic area based at least in part on the adjusted position, wherein the adjusting the map topology comprises resizing the orientation point of interest and removing one or more features of the map that are proximate to the adjusted position; and providing for display, within the mapping application, a map view representing the geographic area, the representation including the orientation point of interest at the adjusted position associated with the map data, whereby the orientation point of interest is shown within the geographic area.

11. The computing system of claim 10, wherein identifying, by the one or more computing devices, a plurality of points of interest comprises identifying the orientation point of interest.

12. The computing system of claim 10, wherein the orientation point of interest is located within a threshold distance of the geographic area.

13. The computing system of claim 10, wherein identifying, by one or more computing devices, a plurality of points of interest comprises identifying the points of interest based at least in part on metadata respectively associated with the points of interest.

14. The computing system of claim 10, wherein the adjusting a map topology comprises removing, adjusting, rearranging, or editing one or more map features associated with the map topology.

15. The computing system of claim 10, wherein the adjusting a map topology comprises removing one or more map features, the one or more removed map features being selected as map features which are proximate to the adjusted position according to a proximity criterion.

16. A non-transitory computer-readable storage medium including instructions that, when executed by at least one processor of an electronic device, cause the electronic device to perform a method comprising:

identifying a plurality of points of interest associated with a geographic area to be displayed as a map view in a viewport associated with a digital mapping application;

determining an adjusted position for an orientation point of interest which in the physical world is outside the geographic area, the adjusted position being a position within the geographic area that does not align with a position of the orientation point of interest in the physical world;

adjusting a map topology associated with map data defining a visual representation of the geographic area based at least in part on the adjusted position, wherein the adjusting the map topology comprises resizing the orientation point of interest and removing one or more features of the map that are proximate to the adjusted position; and providing for display, within the mapping application, a map view representing the geographic area, the representation including the orientation point of interest at the adjusted position associated with the map data, whereby the orientation point of interest is shown within the geographic area.

17. The non-transitory computer-readable storage medium of claim 16, wherein the orientation point of interest is located within a threshold distance of the geographic area.

18. The non-transitory computer-readable storage medium of claim 16, wherein identifying, by one or more computing devices, a plurality of points of interest comprises identifying the points of interest based at least in part on metadata respectively associated with the points of interest.

19. The non-transitory computer-readable storage medium of claim 16, wherein the adjusting a map topology comprises removing, adjusting, rearranging, or editing one or more map features associated with the map topology.

20. The non-transitory computer-readable storage medium of claim 16, wherein the adjusting a map topology comprises removing one or more map features, the one or more removed map features being selected as map features which are proximate to the adjusted position according to a proximity criterion.

* * * * *